United States Patent [19]

Alagy et al.

[11] 4,039,649
[45] Aug. 2, 1977

[54] PROCESS FOR REMOVING SULFUR FROM WASTE WATERS CONTAINING SULFURIC ACID

[75] Inventors: Jacques Alagy, Lyon; Christian Busson, Rueil Malmaison; Maurice Cessou, Communay, all of France

[73] Assignee: Institut Francais du Petrole, Rueil-Malmaison, France

[21] Appl. No.: 603,621

[22] Filed: Aug. 11, 1975

[30] Foreign Application Priority Data

| | | |
|---|---|---|
| Aug. 14, 1974 | France | 74.28500 |
| Mar. 6, 1975 | France | 75.07330 |

[51] Int. Cl.$^2$ ............ C01B 17/50; C01B 17/96; C01C 1/02; B01D 5/00
[52] U.S. Cl. .................. 423/540; 210/45; 210/DIG. 1; 423/DIG. 2; 423/356; 423/544; 423/566
[58] Field of Search .............. 423/356, 541, 541 A, 423/542, 547, 548, 549, 555, 566, 575; 210/45, DIG. 1

[56] References Cited

U.S. PATENT DOCUMENTS

| | | | |
|---|---|---|---|
| 1,108,705 | 8/1914 | Cobb | 423/548 X |
| 1,274,247 | 7/1918 | Danneel et al. | 423/547 |
| 2,856,267 | 10/1958 | Kamlet | 423/566 X |
| 2,862,789 | 12/1958 | Burgress | 423/545 X |
| 3,561,925 | 2/1971 | Deschamps et al. | 423/356 |
| 3,729,551 | 4/1973 | Gorin | 423/566 X |
| 3,862,335 | 1/1975 | Renault et al. | 423/575 |

FOREIGN PATENT DOCUMENTS

| | | | |
|---|---|---|---|
| 378,684 | 8/1932 | United Kingdom | 423/547 |

*Primary Examiner*—O. R. Vertiz
*Assistant Examiner*—Gary P. Straub
*Attorney, Agent, or Firm*—Millen & White

[57] ABSTRACT

Process for recovering sulfur from waste waters containing sulfuric acid, comprising reacting in a first step, the waste water with an aqueous solution of ammonium sulfite, separating the formed sulfur dioxide from the solution, reacting the resulting solution in a second step with calcium oxide to form calcium sulfate and an aqueous ammonia solution, vaporizing ammonia therefrom, reducing the calcium sulfate by means of carbon to form calcium oxide and sulfur dioxide, contacting said vaporized ammonia with said sulfur dioxide and with water, thereby forming an aqueous solution of ammonium sulfite, which is joined to that used in the first step and recycling at least a part of the calcium oxide obtained by reduction of the calcium sulfate to the second step.

15 Claims, 6 Drawing Figures

PROCESS FOR REMOVING SULFUR FROM WASTE WATERS CONTAINING SULFURIC ACID

Prior patents have disclosed a process for removing sulfur from waste waters containing sulfuric acid, ammonium sulfate and/or sulfates of heavy metals (EN 73/42940, 73/24127, 73/43318, 74/08095).

All the previous embodiments of such a process included the use of barium sulfide, obtained by selective reduction of barium sulfate. It has now been observed that it was possible to substitute calcium to barium and that said substitution resulted in some advantages. In particular, it has been observed that the field of applicability of the process was improved, mainly as a result of the fact that calcium sulfate leads, by reduction with carbon, to mixtures CaO-CaS in which the respective proportions of CaO and CaS may be adjusted nearly at will. As a matter of fact, it may be considered that BaSO$_4$ is nearly exclusively reduced to BaS according to the reaction:

$$BaSO_4 + C \rightarrow BaS + Co_2$$

This reaction is generally performed in revolving furnaces, at temperatures from 1100° to 1200° C.

The same operation, when conducted with calcium sulfate, for example at a temperature from 900 to 1200° C, leads to the mixture CaO-CaS according to the following simplified scheme:

$$CaSO_4 \xrightarrow{C} (1 - x) CaO + x CaS + (1 - x) SO_2$$

In addition carbon oxides and water are formed.

Depending on the conditions of operation in the reduction furnace, there may be obtained a molar ratio of CaS/CaO from 0 to 10, usually from 0.1 to 10. There may be used, for example, a ratio from 0 to 5.

The process of this invention may be used for the treatment of an aqueous solution of sulfuric acid or of any mixture of sulfuric acid with ammonium sulfate. The solution may also contain soluble sulfates of metals from groups I to VIII of the periodic classification of elements, e.g. sulfates of iron, cobalt, nickel, vanadium, aluminum, cadmium chromium, copper, manganese, tin or zinc (in particular the sulfates of metals from groups Ib, IIb, and III to VIII, these metals being referred to as "heavy metals").

By means of the process of the invention, sulfur is recovered in the form of concentrated sulfur dioxide which can be used directly for the synthesis of SO$_3$. In some cases a portion of the sulfur is recovered as elemental sulfur.

The metals are recovered in the form of sulfides and/or hydroxides, precipitated and filtered. When recovered in the form of sulfides, the latter can be subjected optionally to a roasting step. The produced dilute SO$_2$ is then fed back to the general recovery system.

The invention concerns a process for recovering sulfur from waste water containing sulfuric acid, said sulfur being obtained in the form of sulfur dioxide and, optionally, elemental sulfur, said process comprising (a) reacting the waste water with an aqueous solution of ammonium sulfite and separating the formed sulfur dioxide from the solution, (b) reacting calcium oxide with the solution obtained in step (a), so as to precipitate the sulfate ions in the form of calcium sulfate and to form an aqueous solution of ammonia, (c) vaporizing the ammonia from the aqueous solution, (d) reducing the calcium sulfate by means of carbon so as to form calcium oxide and a gas containing sulfur dioxide, (e) contacting the ammonia produced in step (c) with a gas containing sulfur dioxide and with water, so as to form an aqueous solution of ammonium sulfite, (f) feeding back at least one portion of said aqueous solution to step (a), and (g) feeding back to step (b) at least one portion of the calcium oxide obtained from step (d).

The invention also relates to the embodiment where, during step (b), there is used a mixture of calcium oxide and calcium sulfide and in which, during step (d), the calcium sulfate is only partially reduced in order to obtain a mixture of calcium oxide and calcium sulfide which is fed back to step (b), so as to obtain, as products of said step (b), calcium sulfate and an aqueous solution containing ammonia at least partly in the form of ammonium sulfide, said solution being heated to obtain a gas containing ammonia and hydrogen sulfide, which gas is reacted with a portion of the sulfur dioxide formed in the process, so as to obtain sulfur which is separated from ammonia, said ammonia being fed back, at least partly, to step (e).

The solution of ammonium sulfite is usually an aqueous solution of ammonium sulfite and ammonium bisulfite (molar ratio NH$_3$/SO$_2$ from 1 to 2, preferably from 1.2 to 1.6); this solution may contain an additional amount of ammonium sulfate produced by controlled oxidation of the sulfite solution. Step (a) is generally conducted at a pressure closed to atmospheric, preferably at a temperature from 20° to 120° C and more preferably from 40° to 80° C.

The reaction of step (a) results in the evolution of concentrated SO$_2$ which can be directly used for the synthesis of SO$_3$. A portion of this SO$_2$ may be fed to a sulfur producing unit as mentioned hereinafter.

After the first treatment, and the evolution of SO$_2$, the resulting aqueous solution contains, in variable proportions:

ammonium sulfate and bisulfate metal sulfates (when initially present)

ammonium sulfite and bisulfite (when the water subjected to the treatment has an insufficient free acid values).

The resulting solution, made free as far as possible from the evolved SO$_2$, for example by stripping, is then treated, in the case where it contains metal sulfates, with ammonia and hydrogen sulfide, according to known processes whereby said metal hydroxides and sulfides are precipitated either simultaneously or separately. This operation can be conducted in three different ways:

1. Action of ammonia for precipitating the hydroxides.

Separation of the hydroxides by filtration and washing.

Action of hydrogen sulfide in ammonia medium, for precipitating the sulfides.

Separation of the sulfides by filtration and washing.

These operations are generally conducted at a pressure close to atmospheric and at a temperature from 50 to 80° C which conditions are also those of the operations No. 2 and 3 hereinafter.

2. Simultaneous action of ammonia and hydrogen sulfide, producing the simultaneous precipitation of hydroxides and sulfides.

Separation of the co-precipitate and washing.

3. Action of ammonia, precipitation of hydroxides and action of hydrogen sulfide and precipitation of the sulfides on the already formed hydroxides.

Separation of the co-precipitate and washing.

According to the nature of the metals to be precipitated, the amounts of $NH_3$ and $H_2S$ will be so adjusted as to produce a substantially complete precipitation of said metals. In the case where it would seem desirable to selectively separate certain metals, which can be precipitated in the form of sulfides in acid medium, it would be convenient to perform the treatment with hydrogen sulfide prior to the treatment with ammonia and to proceed to an intermediate filtration of the so-precipitated sulfides.

In the case where the amount of precipitated metal sulfides justifies the recovering of sulfur contained therein it is advisable to proceed to a roasting of the precipitate according to a known method. The gases produces by said roasting, which contain dilute $SO_2$, are joined with other gaseous streams of a similar composition and treated as such in another part of the plant which will be described infra.

The aqueous solution liberated from metal ions is subsequently fed to the reactor where said sulfate ions are precipitated.

In this reactor, the solution is reacted with CaO or with a mixture of CaO and CaS in amounts and proportions determined according to the composition and the amount of liquor to be treated. The reaction time is generally from 5 minutes to 2 hours and the temperature, for example, from 50° to 100° C.

The portion which precipitates, consisting in major part of calcium sulfate, is separated (for example filtered and washed), whereas the filtrate, containing ammonium sulfide and/or ammonia, is fed to a stripping section where ammonia and/or hydrogen sulfide are recovered. This stripping section may comprise one or optionally two columns, when it is desired to take advantage of the fact that hydrogen sulfide is more easy to strip than ammonia when both of them are to be stripped. Such a case is illustrated in example 3. The stripping temperature is, for example, 100°–150° C. The pressure is, for example, from 1 (absolute) bar to 5 (absolute) bars.

The calcium sulfate cake is fed to the reduction furnace together with carbon. The carbon content and the other operating conditions are so adjusted as to obtain the conversion of at least one portion of $CaSO_4$ to CaO alone or to a mixture CaO/CaS in a predetermined ratio, preferably the same ratio as in step (b).

As the carbon source, there can be used coke, coal or hydrocarbons, irrespective of their sulfur content.

The reduction is accompanied with the formation of $SO_2$. Said $SO_2$, diluted in the gases leaving the furnace, may be joined with other streams of dilute $SO_2$. When necessary, said gases may be fed to an incinerator to convert the sulfur-containing compounds to $SO_2$.

The water, liberated from $H_2S$ and/or $NH_3$ by stripping, is discharged as purified water. It is possible, if so desired, to make use of a portion of said water for diluting certain streams and, particularly, the stream of feed charge.

Ammonia and/or hydrogen sulfide, obtained at the top of the stripping section, are used for various purposes: either together or separately. In the case where some metal salts must be precipitated, a portion of the stream may be derived to the reactor in which occurs the precipitation of metal sulfides and hydroxides, the remainder of the stream being fed to a reactor in which, by contact with $SO_2$ in a solvent, sulfur can be produced according to a known technique. By this technique, on the one hand, there is obtained elemental sulfur, and, on the other hand, there is evolved a gas of high ammonia content but without noticeable amount of sulfur-containing compounds.

Said ammonia may be used, after dissolution in water if necessary:

For neutralizing acid streams and bringing the pH thereof into the convenient range in view of the precipitation operations to be performed;

for absorbing the dilute $SO_2$ formed in the process, particularly in step (d). By this way, we obtain the aqueous solution of ammonium sulfite and/or bisulfite, which is used at the beginning of the treatment chain for contact with the feed of waste waters; said absorption may be conducted, for example, between 25° and 80° C.

as product of the plant at the end of the chain when the feed charge subjected to the treatment contained ammonium ions.

The so-described process involves various alternative embodiments:

1. Instead of producing the CaS required for precipitating the sulfides, it is possible to produce only CaO in the furnace where $CaSO_4$ is reduced and to bring from the outside the required amount of sulfide, for example in the form of a solution of ammonium sulfide. This case will be illustrated in example 2.

2. In order to avoid the formation of thiosulfates by reaction between sulfites and sulfides, there can be performed a controlled oxidation of the sulfite solution in the $SO_2$ absorption tower. This case will be illustrated in example 5.

3. In the case of concentrated solutions of waste waters, the precipitation of the sulfates can be performed by means of a mixture CaO-CaS in powder form so as to obtain a semi-solid paste to be treated as hereabove described.

Various embodiments of the process of the invention for recovering sulfur from residual waters containing sulfuric acid and sulfates of heavy metals have been hereabove described. By heavy metal we mean any metal whose hydroxides and sulfides are insoluble in an ammoniacal basic medium.

All the embodiments hereabove described included the precipitation of heavy metals in the form of sulfides and/or hydroxides; except in the case where externally produced $H_2S$ or ammonium sulfide is added in stoichiometrical amount for the precipitation of the heavy metals, the carrying out of the process requires the manufacture of calcium sulfide by reduction of calcium sulfate. In most cases, this production leads to the production of a $H_2S$ excess which must be converted again in the unit, thus requiring the use of a reactor for producing sulfur by reaction between $H_2S$ and $SO_2$ according to a known technique. We have now observed that it was possible to omit this additional reactor. Moreover, we have observed that it was possible to considerably reduce the amount of ammonia circulating in the plant.

These improved results are obtained by the following treatment sequence:

a. Residual water is reacted with an aqueous solution of at least one ammonium sulfite, so as to liberate gaseous sulfur dioxide which is separated and to convert the sulfuric acid solution to a solution of at least one ammonium sulfate.

b. The solution obtained in step (a) is treated with ammonia and hydrogen sulfide, the amount of hydrogen sulfide being at most equal to that required for precipitating the metals in the form of sulfides and the amount of ammonia being at least equal to that required for maintaining an excess of free ammonia after precipitation of the metals;

c. The precipitated metals are separated in the form of sulfides and, according to the case, of hydroxides;

d. The remainder of the solution, containing sulfuric acid essentially in the form of ammonium sulfate, is reacted with a mixture of CaO and CaS, the amount of CaS being approximately that required for the production of the hydrogen sulfide required in step (b) and the total amount of CaO + CaS being at least equal to that required for precipitating the ammonium sulfate in the form of calcium sulfate;

e. The precipitated calcium sulfate is separated from the remainder of the solution;

f. The calcium sulfate is reacted with carbon at a reduction temperature, the amount of carbon being so selected as to supply the total amount of CaS + CaO as defined in point (d) and the proportion of CaS being that defined in point (d); a gas containing sulfur dioxide is separated and the mixture CaS + CaO fed to step (d);

g. The hydrogen sulfide and ammonia are removed from the solution obtained in step (e), and the hydrogen sulfide and at least one portion of the ammonium are fed back to step (b); and h. The sulfur dioxide containing gas, obtained in step (f) is reacted with ammonia to produce a solution of ammonium sulfite and bisulfite which is fed back to step (a).

Instead of $H_2S$ and $NH_3$, we can use an ammonium sulfide in step (b). In said step, the amount of ammonia is not significant inasmuch as free ammonia is present after conversion of the ammonium bisulfate to ammonium sulfate.

The separation of step (c) is conducted, for example, by decantation, filtration or centrifugation. The sulfides and hydroxide of heavy metals may then be washed and subjected to combustion, which results in the production of a stream of dilute $SO_2$ which is joined to other similar streams of the process.

The reduction of calcium sulfate by means of carbon at temperatures in the range from 900° to 1300° C and, preferably, from 1000 to 1200° C, is so conducted as to simultaneously produce, in defined amounts, both CaS, which is a source of sulfide ions for the further precipitation of the metal sulfides and, additionally, of calcium ions for the precipitation of the sulfate ions of the feed charge, and CaO, which is the source of the additional portion of calcium ions required for the precipitation of the totality of the sulfate ions. This simultaneous production, in defined amounts, of CaO and CaS is one of the main features of the present invention. The fact that the reduction is not complete, on the one hand, and that it results, on the other hand, in the formation of by-products such as calcium carbonate and combination products of CaO and CaS with ashes resulting from the impurities of the added $CaSO_4$ and from the carbon source, is not detrimental to the good operation of the process. As a matter of fact, the by-products accompanying CaO and CaS at the outlet of the reduction furnace and which are fed back with the latter to the reactor where is carried out the precipitation of $CaSO_4$, behave as inert substances and are recycled to the furnace where a portion thereof is converted to CaO and CaS. In order to avoid a too substantial accumulation of by-products which are not involved in the reduction process, we proceed to a separate treatment on a portion of the solid effluent from the reduction reactor. It has been observed that it was possible to conduct the reduction step in such manner as to considerably reduce the formation of by-products.

The main reactions involved in the reduction step are as follows:

According to a first embodiment, illustrated in the following examples 6 and 7, we proceed, after step (c) and before step (d), to the removal of ammonia from the solution in an operation called "first stripping". Said stripped ammonia is fed to step (h) for absorbing $SO_2$.

According to another embodiment, illustrated in example 8 and which can be used in particular when the amount of free ammonia is relatively low, we may omit the first stripping and carry out step (g) in two times; we first strip all the hydrogen sulfide carrying ammonia which is fed back to step (b) and, subsequently, we strip the remainder of the ammonia which is fed to step (h). The proportion of ammonia fed to step (b) must be sufficient for obtaining a medium which contains free ammonia and the proportion of ammonia fed to step (h) must be sufficient to absorb the $SO_2$ contained in the gases issued from the furnace where $CaSO_4$ is reduced.

A preferred embodiment (examples 7 and 8) consists of precipitating the heavy metals in the form of sulfides only. For this purpose, we make use of $H_2S$ or ammonium sulfide in stoichiometrical amounts with respect to these metals, and the reduction conditions in the furnace are so adjusted as to produce an amount of CaS substantially equal, by mole, to the amount of $H_2S$ or ammonium sulfide required for said precipitation.

The examples 1 to 8, which follow, make apparent the different advantages of the process as well as its very wide field of application. It is shown that, by using all or a part of a unique fabrication scheme, it is possible to treat any aqueous solution containing sulfuric acid in any proportion with or without ammonium sulfate and/or metal sulfates precipitable in the form of hydroxide and sulfides.

To facilitate comprehension, we have shown reaction balances without losses and we have voluntarily neglected the known secondary reactions leading to the formation of by-products whose presence does not result in any disadvantage in the sequence of steps of the process and which may be removed in a known manner, for example by purges of derived streams. Similarly, we have omitted to show the appearance or disappearance of water by chemical reaction. The scope of the invention will be better appreciated from all these features.

These examples are provided by way of illustration. They cannot be considered as limitative of the scope of the invention. In the following, for sake of simplification, the metal sulfates are expressed as $MeSO_4$.

Examples of waste-waters are as follows. Waste water issued from a plant for titanium oxide production from Ilemenite by means of sulfuric acid. Its composition was as follows:

| Composition | Kilomoles per hour |
|---|---|
| $H_2SO_4$ | 131.55 |
| Fe $SO_4$ | 34.84 |
| $TiOSO_4$ | 4.57 |
| $Al_2(SO_4)_3$ | 1.22 |
| Mn $SO_4$ | 0.37 |
| VO $SO_4$ | 0.34 |
| $Cr_2(SO_4)_3$ | 0.06 |
| Mg $SO_4$ | 13.00 |
| $H_2O$ | 2599 |

Waste water from the treatment of an enriched ore (Slag method).

| Composition | Kilomoles per hour |
|---|---|
| $H_2SO_4$ | 71.4 |
| Fe $SO_4$ | 8.65 |
| $TiOSO_4$ | 1.73 |
| $Al_2(SO_4)_3$ | 2.17 |
| Mn $SO_4$ | 0.12 |
| VO $SO_4$ | 0.34 |
| $Cr_2(SO_4)_3$ | 0.05 |
| Mg $SO_4$ | 6.73 |
| $H_2O$ | 4264.4 |

Figure 1:
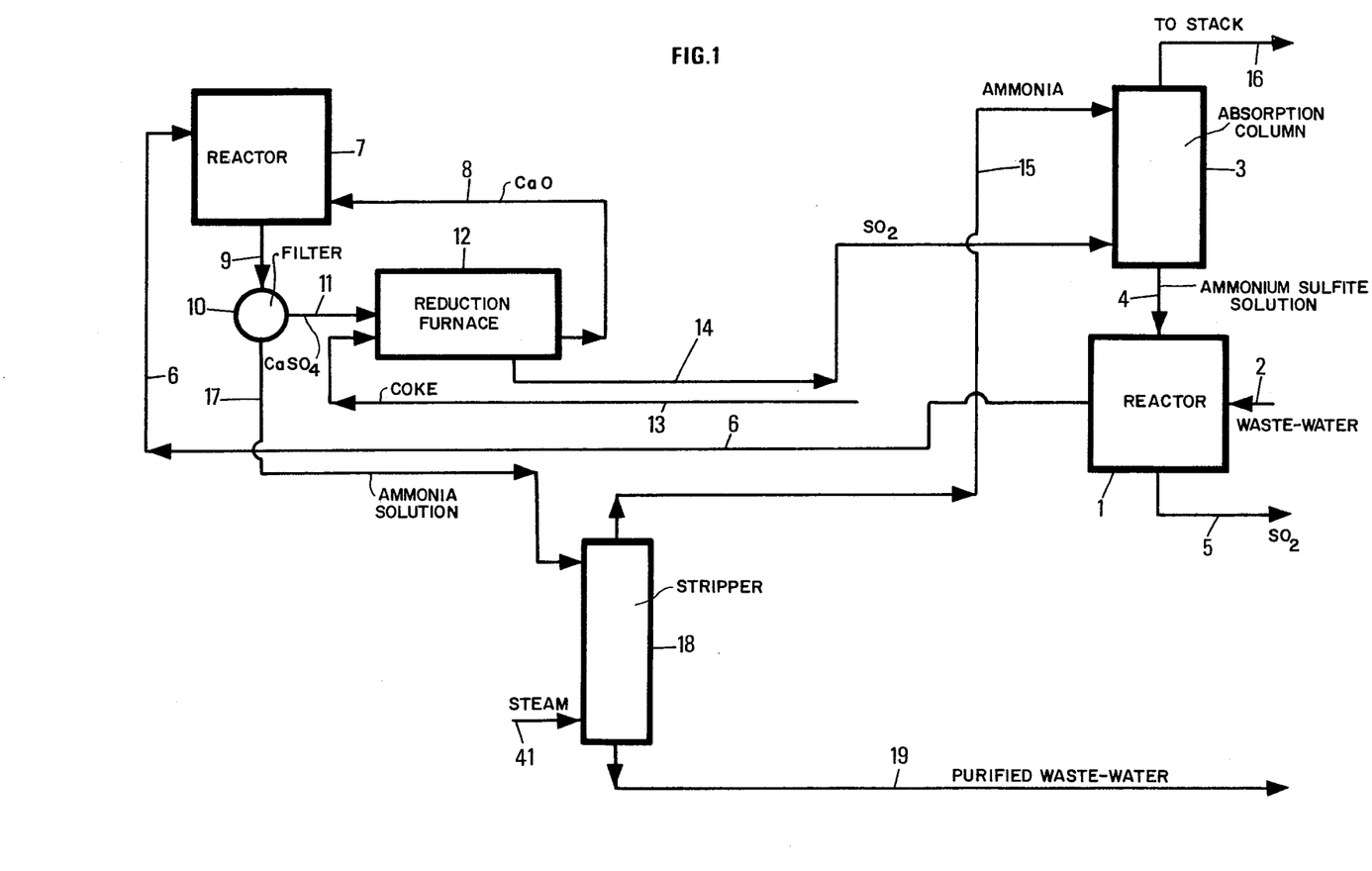
FIG. 1 illustrates the treatment of a waste water containing sulfuric acid, but substantially no heavy metal sulfate.

EXAMPLE 1 (FIG. 1)

This example concerns the treatment of a waste water containing sulfuric acid and organic impurities.

We treat an aqueous sulfuric acid solution containing organic impurities.

The sulfuric acid content of the solution is 15% by weight.

Taking as a basic 1 kmole of $H_2SO_4$ for the material balance, we react in a reactor 1 the waste water fed through duct 2 with an aqueous solution of ammonium sulfite and bi-sulfite issued from the absorption column 3 through line 4. The stoichiometrical reaction is as follows:

The prevailing temperature is 60° C.

Sulfuric acid completely displaces $SO_2$ from the sulfites. The concentrated $SO_2$ revolves through pipe 5; the solution, free from $SO_2$, is conveyed through line 6 to the reactor 7 for precipitation of the calcium sulfate, where it is treated with calcium oxide supplied from line 8. Calcium sulfate precipitates according to the reaction:

The prevailing temperature is 70° C.

The suspension is conveyed through line 9 to filter 10. The cake, washed with purified water, is conveyed through line 11 to the reduction furnace 12 where it is reacted at 1200° C with coke fed through line 13 according to the reaction scheme:

so as to substantially exclusively produce CaO, but no CaS. In this example, as in the following ones, $CO_2$ is the only carbon oxide mentioned, but it must be understood that non-negligible amounts of carbon monoxide may be present.

The $SO_2$ evolved line 14 in admixture with other gases, is conveyed to the absorption tower 3 where it is countercurrently contacted with an ammonia solution line 15 so as to form a sulfitic solution according to the reaction:

The temperature is 70° C.

It is not strictly required to use these amounts. Ther can be used a molar ratio of $NH_3$ to $SO_2$ as low as 1.2. A molar ratio higher than 2, although not excluded, leads however to an ammonia loss in the gaseous stream discharged at the top of the absorption tower 3 through line 16.

The aqueous ammonia solution obtained after filtration of $CaSO_4$, line 17 is stripped at 105° C in column 18 so as to concentrate ammonia at the top. For this purpose, steam is fed through line 41.

The top vapors condensed and cooled down are used for the absorption of $SO_2$ contained in the gases line 15. The purified water is discharged from the bottom of the stripper through line 19. It contains substantially no sulfuric acid.

The total reaction is as follows:

The rate of recovery of sulfur in the form of $SO_2$ is 99%.

Figure 2:
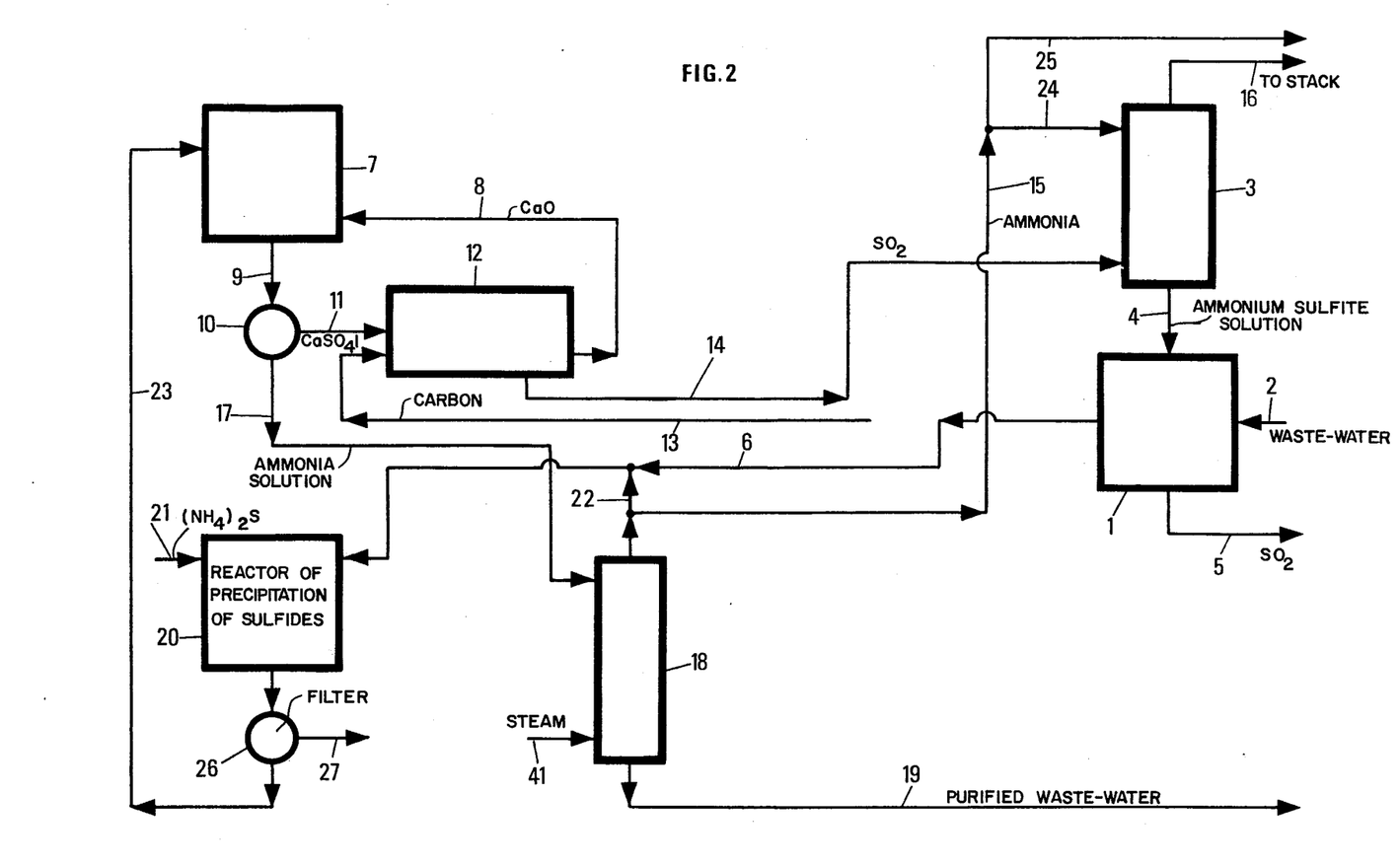
FIG. 2 concerns the treatment of a waste water containing both sulfuric acid and heavy metal sulfates.

EXAMPLE 2 (FIG. 2)

The feed is an aqueous solution containing sulfuric acid and metal sulfates in respective amounts of 2 kmoles of $H_2SO_4$ and 0.6 kmole of $MeSO_4$.

The purpose is to recover metals in the form of sulfides and hydroxides. The amount of metals to precipitate being relatively low, it seems advisable to supply ammonium sulfide instead of regulating the furnace for reduction of $CaSO_4$ in order to produce the corresponding required amount of CaS.

As a matter of fact, and this will be made clear from the following examples, the use of CaS for ensuring the precipitation of metals in the form of sulfides, results ipso facto in the formation of ammonium sulfide which is a source of additional $H_2S$, which has to be treated separately.

It is not advisable to use a greater amount of ammonium sulfide than necessary, since this would result in the same disadvantage.

The sulfitic solution containing 1.3 kmoles of $NH_4HSO_3$ and 1.3 kmoles of $(NH_4)_2SO_3$ supplied through line 4 is contacted with the stream to be treated, containing 2 kmoles of $H_2SO_4$ and 0.6 kmole of $MeSO_4$ (2) in the reactor 1 at 80° C. The liberated $SO_2$ evolves through line 5. The reaction may be written as follows:

$$1.3\ NH_4H\ SO_3 + 1.3\ (NH_4)_2SO_3 + 2\ H_2SO_4 + 0.6\ MeSO_4 \rightarrow 2.6\ SO_2 + 1.90\ (NH_4)_2SO_4 + 0.1\ NH_4H\ SO_4 + 0.6\ MeSO_4$$

The solution discharged from reactor 1 is then fed through line 6 to the reactor for precipitation of sulfides 20 also fed through line 21 with 0.2 kmole of ammonium sulfide supplied from the exterior, and through line 22 with 0.9 kmole of $NH_3$ issued from the top of stipper 18.

The following reaction, conducted at 90° C, takes place:

$$0.6\ MeSO_4 + 1.90\ (NH_4)_2SO_4 + 0.1\ NH_4H\ SO_4 + 0.9\ NH_3 + 0.2\ (NH_4)_2\ S \rightarrow 0.2\ Me\ S + 0.4\ Me(OH)_2 + 2.6\ (NH_4)_2\ SO_4$$

The precipitate is filtered 26, washed with purified water and extracted from the cycle line 27. The filtrate line 23 is treated with calcium oxide in reactor 7. 2.6 kmoles of calcium oxide are supplied through line 18.

The reaction of precipitation, carried out at 70° C, can be written as follows:

$$2.6\ (NH_4)_2\ SO_4 + 2.6\ CaO \rightarrow 2.6\ Ca\ SO_4 + 5.2\ NH_3 + 2.6\ H_2O$$

The calcium sulfate is filtered and washed in filter 10, then supplied through line 11 to the reduction furnace 12 in which are also introduced 1.3 kmoles of carbon through line 13. The reduction is conducted at 1200° C according to the reaction scheme:

$$2.6\ Ca\ SO_4 + 1.3\ C \rightarrow 2.6\ CaO + 2.6\ SO_2 + 1.3\ CO_2$$

Calcium oxide is fed back to the circuit through line 8. The dilute $SO_2$ is conveyed through line 14 to the step of ammonia absorption 3.

The filtrate from filter 10 is conveyed through line 17 to the stripper 18 operated at 110° C and fed with steam through duct 41. At the top of the stripper we recover 5.2 kmoles of $NH_3$.

A portion of condensed vapors is fed back to the reactor of precipitation of sulfides 20 through line 22; it amounts to 0.9 kmole of $NH_3$. The other portion 4.3 kmoles is fed through line 15, on the one hand, to the absorption tower 3 (3.9 kmoles through line 24) and, on the other hand, through line 25, as an excess (0.4 kmole of $NH_3$). Dilute $SO_2$ issued from the reduction furnace 12 is fed through line 14 to the absorption tower 3. The absorption reaction, conducted at 65° C, may be written as follows:

$$2.6\ SO_2 + 3.9\ NH_3 + 2.6\ H_2O \rightarrow 1.3\ NH_4H\ SO_3 + 1.3\ (NH_4)_2SO_3$$

The complete scheme of the process may be written as follows:

$$2\ H_2SO_4 + 0.6\ MeSO_4 + 0.2\ (NH_4)_2S + 1.3\ C \rightarrow 2.6\ SO_2 + 0.2\ MeS + 0.4\ Me(OH)_2 + 1.3\ CO_2 + 0.4\ NH_3 + 1.8\ H_2O$$

The rate at which sulfur is recovered in the form of $SO_2$ is 99%.

The rate of ammonia recovery is 95%. The water discharged is substantially free of sulfuric acid and of heavy metals (less than 1 ppm b.w. of each heavy metal). The amount of magnesium sulfate remains unchanged, as well as in the following examples.

Figure 3:
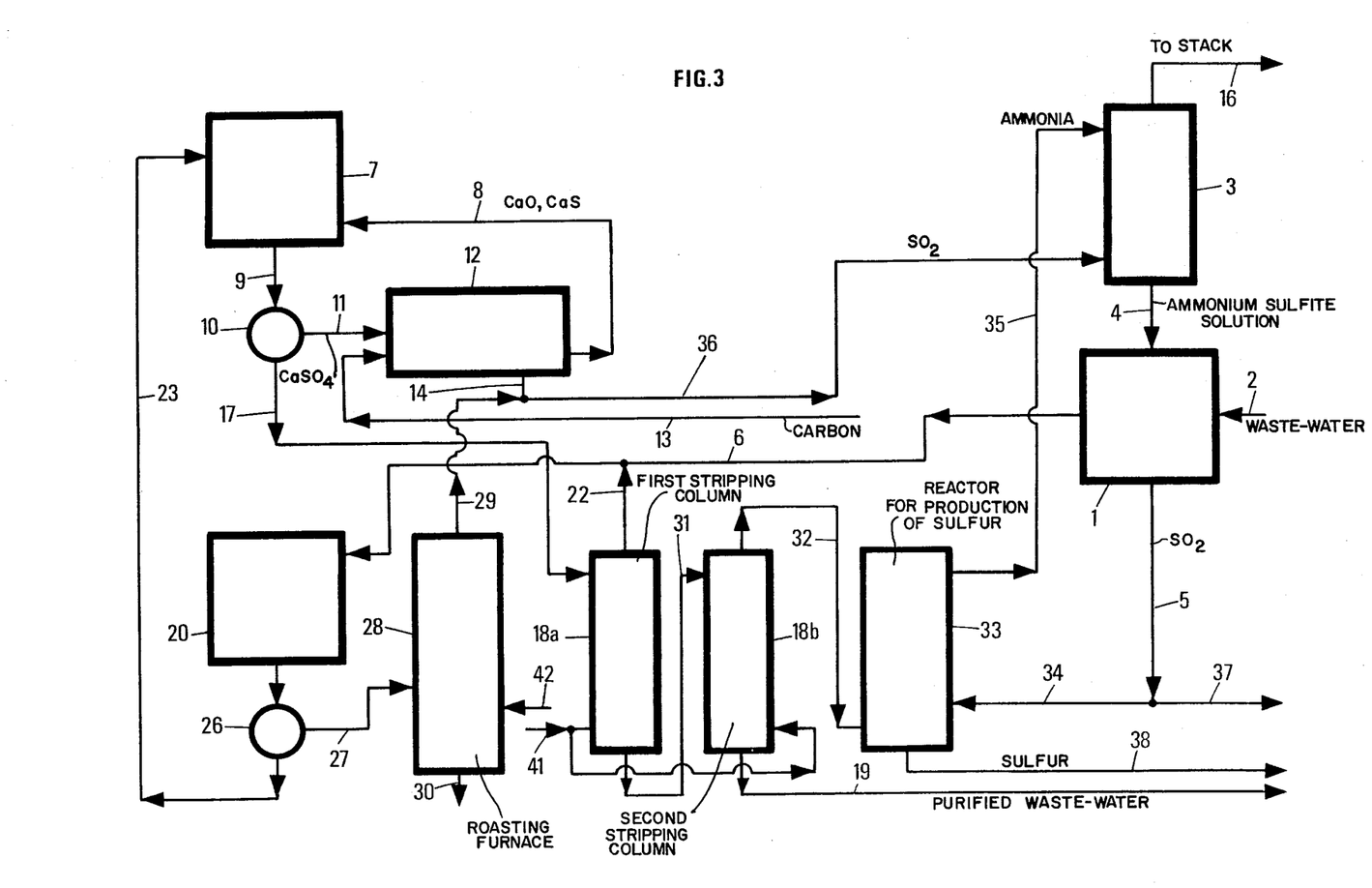
FIG. 3 illustrates the treatment of waste water containing both sulfuric acid and heavy metal sulfates with subsequent roasting of the formed heavy metal sulfides.

EXAMPLE 3 (FIG. 3).

This example concerns the case of a mixture of 2 moles of $H_2SO_4$ with 0.8 mole of $MeSO_4$ with combustion of sulfides and stripping in two columns.

The sulfitic solution, containing 1.333 kmoles of $NH_4H\ SO_3$ and 1.333 kmoles of $(NH_4)_2SO_3$, is conveyed through line 4 to reactor 1 where it is contacted at 70° C with the waste water containing 2 kmoles of $H_2SO_4$ and 0.8 kmole of $MeSO_4$, fed through line 2. The evolved $SO_2$ issues through duct 5. It amounts to 2.666 kmoles.

The obtained neutral solution contains 2 kmoles of $(NH_4)_2SO_4$ and 0.8 kmole of $MeSO_4$. It is withdrawn through line 6.

This solution is contacted at 75° C in reactor 20 with a condesnate issued from the first stripping column 18a through line 22. This condensate contains 4 kmoles of $NH_3$ and 0.7 kmole of $H_2S$.

A portion of the metals precipitates in the form of MeS, the other portion in the form of hydroxide Me$(OH)_2$. In the considered example, ⅞ of the metals precipitate in the form of MeS and ⅛ in the form of Me$(OH)_2$.

The stoichiometrical equation of the reaction can be written as follows :

$$2\ (NH_4)_2SO_4 + 0.8\ MeSO_4 + 4\ NH_3 + 0.7\ H_2S \rightarrow 2.8\ (NH_4)_2SO_4 + 0.7\ Me\ S + 0.1\ Me(OH)_2 + 2.4\ NH_3$$

In the present case we made use of the exactly required $H_2S$ amount. We might have used a $H_2S$ excess but it would have resulted only in an excess charge of all the subsequent steps of the treatment.

The precipitated sulfides and hydroxides are filtered through filter 26. The cake, washed with purified water, is conveyed through line 27 to the roasting furnace 28 fed with air through line 42. Dilute $SO_2$ produced by combustion of the sulfides (0.7 kmole) is withdrawn through line 29 and joined to the other streams of dilute $SO_2$.

The metal oxides are withdrawn from the lower part of the furnace in the form of $Me_2O_3$ (0.4 kmole) through line 30.

The filtrate from filter 26 is conveyed through line 23 to the reactor 7 in which is conducted the precipitation of $CaSO_4$. It contains 2.8 kmoles of $(NH_4)_2SO_4$ and 2.4 kmoles of $NH_3$. The mixture CaO-CaS issuing from the reduction furnace 12 through line 8 contains 1.97 kmoles of CaO and 0.83 kmole of CaS.

The precipitation reaction, conducted at 75° C, conforms with the following scheme:

$$2.8\ (NH_4)_2SO_4 + 1.97\ CaO + 0.83\ CaS \rightarrow 2.8\ CaSO_4 + 0.83\ (NH_4)_2S + 6.34\ NH_3$$

The cake filtered and washed with purified water in filter 10, is conveyed through line 11 to the reduction furnace 12. A determined amount of carbon (2.64 kmoles) is fed through line 13 The reduction reaction, conducted at 1100° C, can be written as follows:

$$2.8\ CaSO_4 + 2.64\ C \rightarrow 1.97\ CaO + 0.83\ CaS + 1.97\ SO_2 + 2.64\ CO_2$$

The produced dilute $SO_2$ is discharged from the furnace through line 14 and joined to the stream of dilute $SO_2$ from line 29. The mixture CaO-CaS is fed to the precipitation reactor 7 through line 8.

The filtrate from filter 10 is fed to the first stripping column 18a through line 17. At the top of the colum 18a, we recover 84% of $H_2S$ and 50% of $NH_3$, contained in the solution to be stripped: i.e. 0.7 kmole of $H_2S$ and 4 kmoles of $NH_3$ are obtained, which are conveyed through line 22 to the reactor for precipitation of sulfides 20.

This column is operated at 115° C and fed, at its bottom part, with stream line 41a.

The bottom fraction from the tower is fed through line 31 to the second stripping column 18b and the remainder of $H_2S$ and $NH_3$, i.e. 0.13 kmole of $H_2S$ and 4 kmoles of $NH_3$, is recovered at the top. The latter column is operated at 108° C and fed with steam through duct 41b.

The purified water is withdrawn from the bottom of the second stripper through line (19).

The top fraction from the second stripper is fed through line 32 to the reactor for the production of sulfur 33. A portion of the $SO_2$ conveyed through line 5 is fed through line 34 to reactor 33 (0.065 kmole). In this reactor, the following reaction takes place at 150° C:

$$4\ NH_3 + 0.13\ H_2S + 0.065\ SO_2 \rightarrow 0.195\ S + 4\ NH_3$$

The ammonia which acted as catalyst in this reaction, escapes from reactor 33 through line 35 and is used for the absorption in tower 3.

The collected streams of dilute $SO_2$ are fed through line 36 to the bottom of said absorption tower 3.

The absorption reaction, conducted at 70° C, can be written as follows:

$$1.97\ SO_2 + 0.7\ SO_2 + 4\ NH_3 \rightarrow 1.333\ NH_4H\ SO_3 + 1.333\ (NH_4)_2SO_3$$

The sulfitic liquor thus obtained is conveyed through line 4 to the reator from which evolves $SO_2$ (1), so as to close the loop.

The recovery rate, in the form of $SO_2$, of the sulfur involved is 91.5%. The recovery rate, in the form of elemental sulfur, of the sulfur involved is 7.5%. The total recovery rate of sulfur amounts to 99%.

The discharged water is substantially free from sulfuric acid and from heavy metals (less than 1 ppm b.w.).

EXAMPLE 3 bis

Example 3 is repeated except that the stripping step is conducted in a single column. The total amount of $NH_3$ in circulation amounts to 25 kmoles (instead of 8 kmoles in the case of example 3), 21 kmoles of which are conveyed to the unit for the precipitation of sulfides and 4 kmoles to the unit for $SO_2$ absorption. From this example it is clearly apparent that stripping in two successive columns is more interesting.

Figure 4:
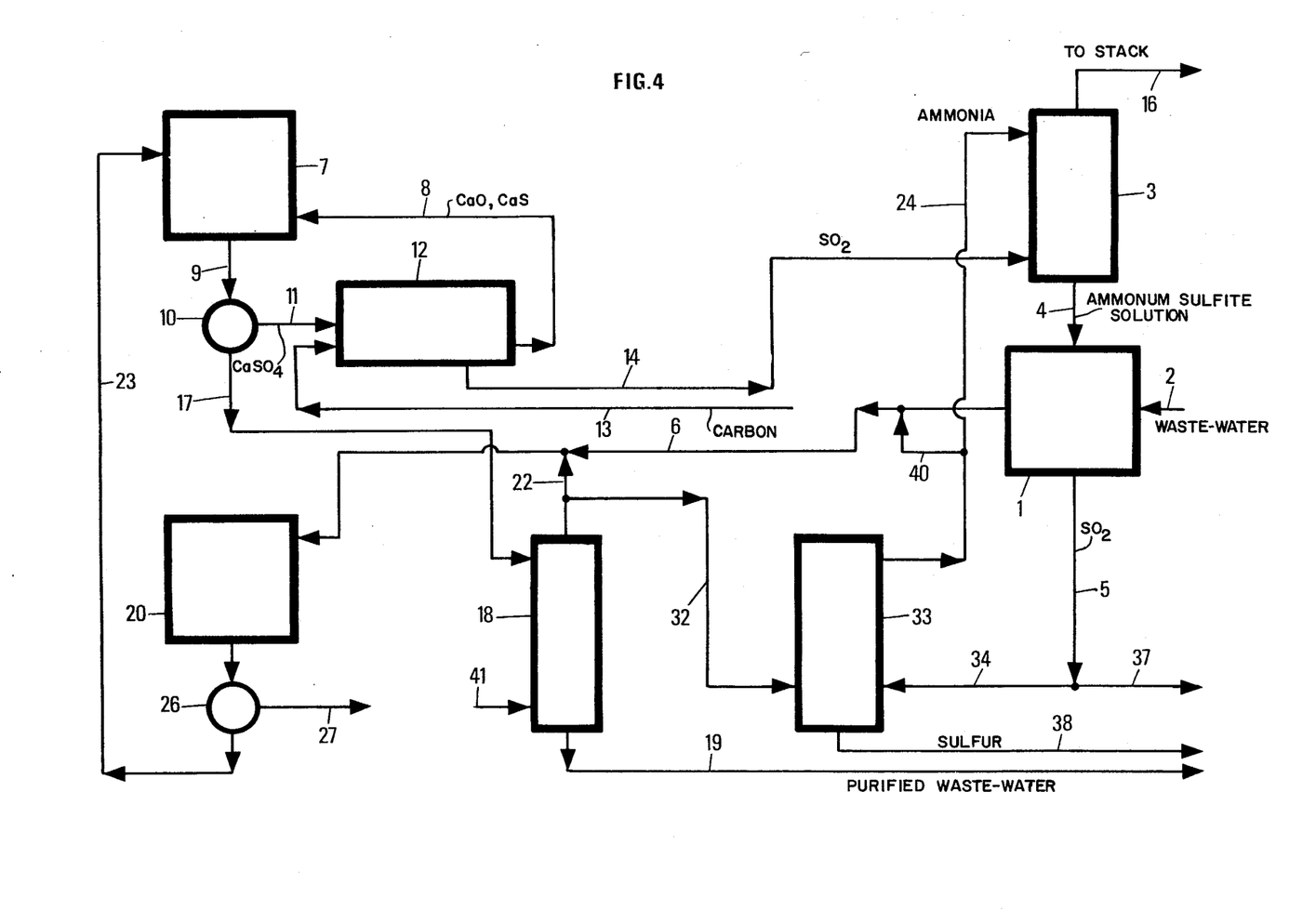
FIG. 4 illustrates the treatment of a waste water containing both sulfuric acid and heavy metal sulfates, without any roasting of the formed heavy metal sulfides.

EXAMPLE 4 (FIG. 4)

Example 4 refers to the case of treatment of aqueous solutions containing sulfuric acid and metal sulfates, without any roasting of the sulfides and making use of a definite ratio CaO/CaS in the step of reduction of Ca-$SO_4$. In this example, the molar proportion was 50% CaS and 50% CaO.

The balance is calculated for 2 kmoles of $H_2SO_4$ and 0.8 kmole of $MeSO_4$.

The fifty-fifty distribution between CaO and CaS leads to a defined distribution between $SO_2$ and S as ultimate recovered products.

An aqueous sulfitic solution containing 0.7 kmole of $NH_4H\ SO_3$ and 0.7 kmole of $(NH_4)_2SO_3$ is conveyed through line 4 to reactor 1 simultaneously with the stream to be treated which contains 2 kmoles of $H_2SO_4$ and 0.8 kmole of $MeSO_4$ (line 2).

The reaction, taking place at 80° C, is as follows:

$$0.7\ NH_4H\ SO_3 + 0.7\ (NH_4)_2\ SO_3 + 0.8 MeSO_4 + H_2SO_4 \rightarrow 1.9\ NH_4H\ SO_4 + 0.1\ (NH_4)_2SO_4 + 0.8\ Me\ SO_4 + 1.4\ SO_2$$

The evolved $SO_2$ is withdrawn through line 5.

The liquor, made free from $SO_2$ is conveyed through line (6) to the reactor of precipitation of sulfides 20. We also introduce into said reactor 3.5 kmoles of $NH_3$ and 0.7 kmoles of $H_2S$ through lines 22 and 40. The metals precipitate at 85° C according to the reaction:

$$1.9\ NH_4H\ SO_4 + 0.1\ (NH_4)_2SO_4 + 0.8\ Me\ SO_4 + 3.5\ NH_3 + 0.7\ H_2S \rightarrow 2.8\ (NH_4)_2SO_4 + 0.7\ Me\ S + 0.1\ Me\ (OH)_2$$

The precipitate is filtered and washed on filter 26. The cake is extracted from the cycle through line 27. The filtrate is conveyed through line 23 to the reactor of precipitation of sulfates 7. In this reactor, operated at 90° C, we introduce 1.4 kmole of CaO and 1.4 kmole of CaS through line 8. $CaSO_4$ precipitates according to the reaction:

$$2.8\ (NH_4)_2SO_4 + 1.4\ CaO + 1.4\ CaS \rightarrow 2.8\ CaSO_4 + 1.4\ (NH_4)_2S + 2.8\ NH_3$$

The precipitate is filtered and washed on filter 10 and then conveyed through line 11 to the reduction furnace 12.

The amount of carbon fed through line 13 is so adjusted that is produces a fifty-fifty % mixture of CaO and CaS (at 1100° C).

$$2.8\ CaSO_4 + 3.5\ C \rightarrow 1.4\ CaO + 1.4\ CaS + 1.4\ SO_2 + 3.5\ CO_2$$

The mixture CaO-CaS is conveyed to reactor 7. Dilute $SO_2$ escapes through line 14 toward the column 3.

The filtrate from filter 10 is fed through line 17 to stripper 18, also fed with steam through pipe 41.

At the top of the stripper we recover 5.6 kmoles of $HN_3$ and 1.4 kmole of $H_2S$. The stripper is operated at 125° C.

The stream is divided into two portions: one portion containing 2.8 kmoles of $NH_3$ and 0.7 kmole of H2S is conveyed through line 22 to the reactor for precipitation of sulfides 20. The other portion, containing 2.8 kmoles of $NH_3$ and 0.7 kmole of $H_2S$ is conveyed through line 32 to the reactor for sulfur production 33.

In said reactor, operated at 140° C, we introduce, through line 34 0.35 kmole of $SO_2$.

The reaction of sulfur production can be written as follows:

$$2.8\ NH_3 + 0.7\ H_2S + 0.35 SO_2 \rightarrow 1.05\ S + 2.8\ NH_3$$

Sulfur is removed through line 38. The net production of $SO_2$, i.e. 1.05 kmole, is discharged through line 37.

The ammonia recovered at the top of the reactor 33 is partly conveyed to the absorption column 3 through line 24. It amounts to 2.1 kmoles of $NH_3$. The other portion (0.7 kmole) is conveyed through line (40) to the reactor for precipitation of sulfides 20 The absorption reaction, conducted at 40° C, may be written as follows:

$$1.4\ SO_2 + 2.1\ NH_3 \rightarrow 0.7\ NH_4HSO_3 + 0.7\ (NH_4)_2SO_3$$

The sulfitic solution recovered at the bottom of the absorption tower is fed through line 4 to reactor 1 where it is contacted with the stream to be treated.

The total equation of the process may be written as follows:

$$2\ H_2SO_4 + 0.8\ MeSO_4 + 3.5\ C \rightarrow 0.7\ MeS + 0.1\ Me(OH)_2 + 1.05\ S + 1.05\ SO_2 + 3.5\ CO_2 + 1.9\ H_2O$$

The recovery rate of the sulfur is:
37% in the form of sulfur
37% in the form of $SO_2$
25% in the form of metal sulfides.

The discharged water is substantially free from sulfuric acid and from heavy metals (less than 1 ppm by weight of each heavy metal).

Figure 5:
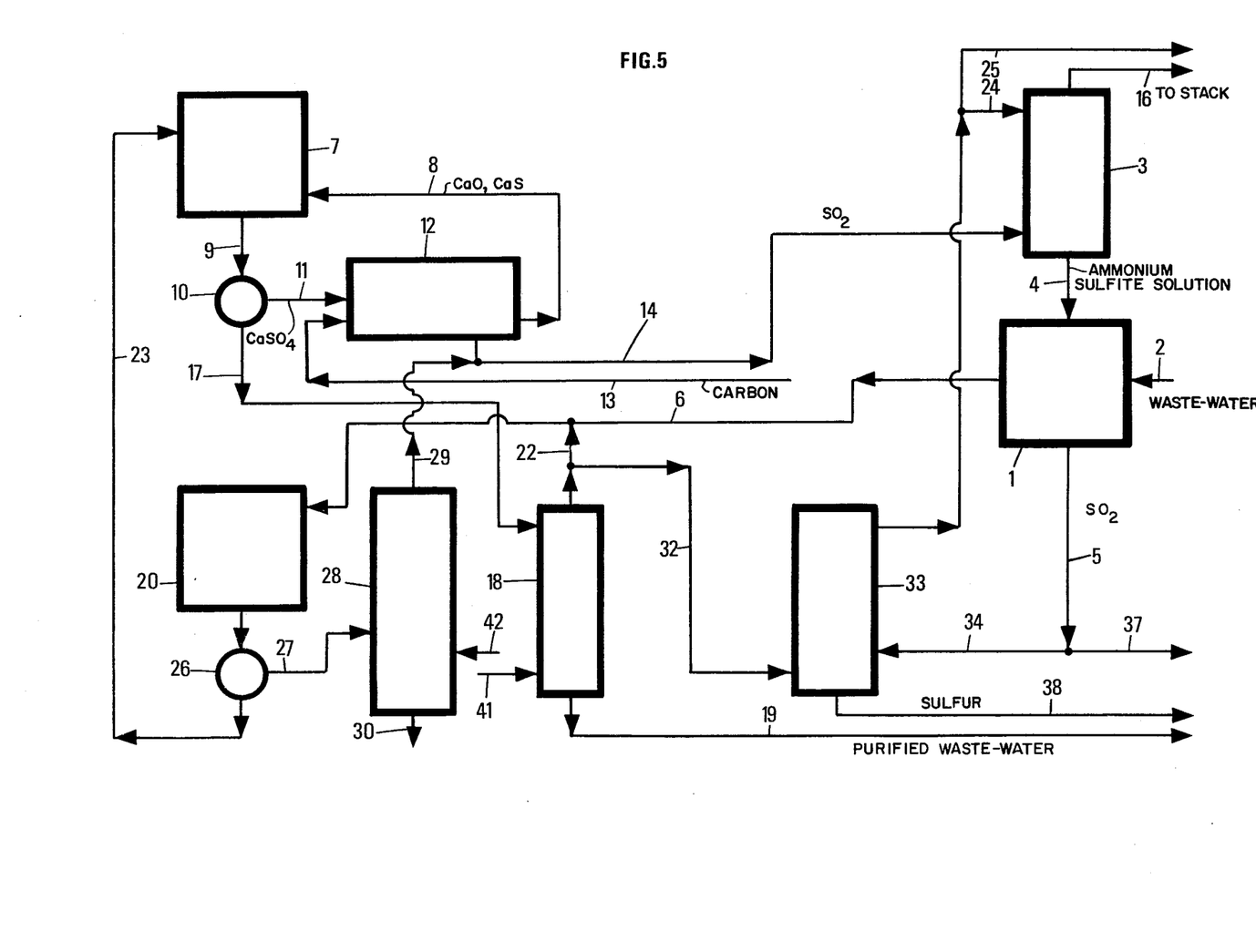
FIG. 5 illustrates a modification of the process in which a portion of the sulfitic solution is oxidized.

EXAMPLE 5 (FIG. 5)

Example 5 illustrates an alternative embodiment of the process in which a portion of the sulfitic solution obtained during the absorption is oxidized.

In the present case the aqueous solution contains: 0.2 kmole of $H_2SO_4$, 1.3 kmoles of $NH_4HSO_4$ and 0.5 kmole of $MeSO_4$, and the produced metal sulfides are burnt.

A sulfitic solution containing 0.7 kmole of $NH_4HSO_3$, 0.5 kmole of $(NH_4)_2SO_3$ and 0.2 kmole of $(NH_4)_2SO_4$, is conveyed through line 4 to rector 1 where it is reacted with the stream to be treated having the above-mentioned composition, fed through line 2; the reaction can be written as follows:

$$0.7\ NH_4HSO_3 + 0.5\ (NH_4)_2SO_3 + 0.2\ (NH_4)_2SO_4 + 0.2\ H_2SO_4 + 1.3\ NH_4HSO_4 + 0.5\ MeSO_4 \rightarrow 1.2\ SO_2 + 1.7\ (NH_4)_2SO_4 + 0.5\ MeSO_4$$

The reaction temperature is 50° C. The evolved $SO_2$ escapes through line (5).

The resulting solution is conveyed through line 6 to the reactor of precipitation of sulfides 20 where it is contacted with a mixture containing 1.7 kmole of $NH_3$ and 0.4 kmole of $H_2S$, fed through line 22. The metal precipitate according to the reaction:

$$1.7\ (NH_4)_2SO_4 + 0.5\ MeSO_4 + 1.7\ NH_3 + 0.4\ H_2S \rightarrow 0.4\ MeS + 0.1Me(OH)_2 + 2.2\ (NH_4)_2SO_4 + 0.7\ NH_3$$

This reaction is conducted at 55° C.

The sulfides are filtered and washed on filter 26, then conveyed through line 27 to the furnace for roasting the sulfides (28) where the metals are converted to oxides according to the reaction:

$$0.4\ MeS + 0.1\ Me(OH)_2 + 0.725\ O_2 \rightarrow 0.4\ SO_2 + 0.25\ Me_2O_3 + 0.1\ H_2O$$

Air is introduced through line (42). Dilute $SO_2$ escapes through line (29). Oxides are discharged through line (30).

The filtrate from filter (26) is conveyed through line (23) to the reactor (7) for precipitation of $CaSO_4$, into which is also introduced, thrugh line (8), a mixture of CaO and CaS issued from the reduction furnace (12) and containing 1 kmole of CaO and 1.2 kmole of CaS.

The precipitation reaction can be written as follows:

$$2.2\ (NH_4)_2SO_4 + 0.7\ NH_3 + 1\ CaO + 1.2\ CaS \rightarrow 2.2\ CaSO_4 + 1.2\ (NH_4)_2S + 2.7\ NH_3$$

It is conducted at 70° C.

$CaSO_4$ is filtered and washed on filter (10), then conveyed through line (11) to the reduction furnace (12). In this furnace, we also introduce 2.9 kmoles of carbon (13), which results in the following reaction conducted at a temperature of about 1100° C:

$$2.2\ CaSO_4 + 2.9\ C \rightarrow 1\ CaO + 1.2\ CaS + 1\ SO_2 + 2.9\ CO_2$$

Dilute $SO_2$ escapes through line (14). The mixture CaO-CaS is fed back to reactor (7) through line (8).

The filtrate from filter (10) is conveyed through line (17) to the stripping column (18). This column is operated at 112° C. The stripping vapor is introduced through line (41). At the top of said column, we recover 5.1 kmoles of $NH_3$ and 1.2 kmole of $H_2S$. The stream is divided into two portions: one portion, containing 1.7 kmole of $NH_3$ and 0.4 kmole of $H_2S$, is fed through line (22) to the reactor (20) and the other portion, containing 3.4 kmoles of $NH_3$ and 0.8 kmole of $H_2S$, is fed through line (32) to reactor (33).

Reactor (33) is also fed with 0.4 kmole of $SO_2$ (line 34). The reaction which takes place is as follows:

$$0.8\ H_2S + 3.4\ NH_3 + 0.4\ SO_2 \rightarrow 1.2\ S + 3.4\ NH_3$$

The reactor is operated at 160° C.

Sulfur is discharged from the system through line (38).

The ammonia discharged at the top is divided into two streams: 1.3 kmoles constituting the production (25) and 2.1 kmoles which are fed to the step of absorption through line (24).

The absorption tower (3) is fed with different streams of dilute $SO_2$ (lines 14 and 29) and with 2.1 kmoles of $NH_3$ (24). A partial oxidation is also performed by injection of air at the bottom portion (line 43). The reaction, conducted at 70° C, may be written as follows:

$$1\ SO_2 + 0.4\ SO_2 + 2.1\ NH_3 + 0.1\ O_2 + 1.4\ H_2O \rightarrow 0.7\ NH_4HSO_3 + 0.5\ (NH_4)_2SO_3 + 0.2\ (NH_4)_2SO_4$$

This solution is conveyed through line (4) to reactor (1). The total equation of the process may be written:

$$0.2\ H_2SO_4 + 1.3\ NH_4HSO_4 + 0.5\ MeSO_4 + 29\ C + 0.825\ O_2 \rightarrow 0.8\ SO_2 + 1.2\ S + 1.3\ NH_3 + 2.9\ CO_2 + 0.25\ Me_2O_3 + 1.5\ H_2O$$

The recovery yield of sulfur in the form of $SO_2$ is 39.6% and the recovery yield of sulfur in the form of elemental sulfur is 59.4%.

The recovery yield of $NH_3$ amounts to 95%.

The water discharged is free from sulfuric acid. It contains less than 2 ppm of heavy metals.

Figure 6:
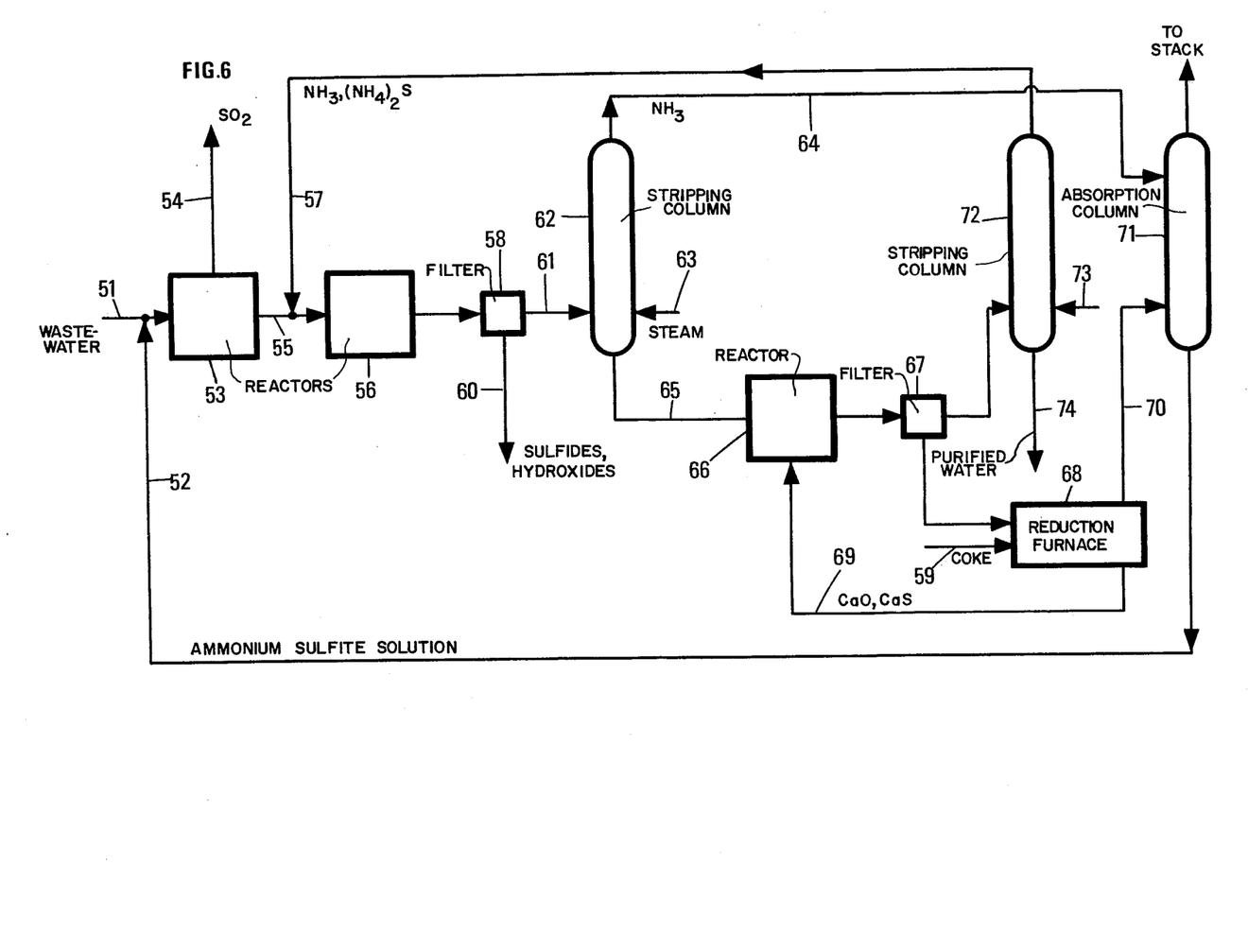
FIG. 6 illustrates a preferred embodiment of the process in which the amount of ammonia in circulation is small and whereby the production of $H_2S$ in excess is avoided.

EXAMPLE 6 (FIG. 6)

A sulfuric waste water containing 150 kmoles of sulfuric acid and 60 kmoles of metal sulfates (line 51) is treated with a sulfitic solution containing 82.5 kmoles of ammonium sulfite and 82.5 kmoles of ammonium bisulfite (line 52) in reactor (53); 165 kmoles of $SO_2$ evolve and 97.5 kmoles of ammonium sulfate and 52.5 kmoles of ammonium bisulfate (line 55) are produced according to the reaction:

$$150\ H_2SO_4 + 60\ MeSO_4 + 82.5\ NH_4H\ SO_3 + 82.5\ (NH_4)_2SO_3 \rightarrow 165\ SO_2 + 52.5\ NH_4H\ SO_4 + 97.5\ (NH_4)_2SO_4 + 60\ MeSO_4 + 165\ H_2O$$

The resulting solution, free from $SO_2$ (line 54), is contacted in the reactor (56) with a solution containing 330 kmoles of $NH_3$ and 45 kmoles of $(NH_4)_2S$ (line 57). The metals are thus precipitated in the form of sulfides and hydroxides which are filtered, washed and withdrawn from the cycle (filter 58). There are thus withdrawn 45 kmoles of metal sulfide and 15 kmoles of metal hydroxides (line 60). The precipitation reaction may be written as follows:

$$52.5\ NH_4H\ SO_4 + 97.5\ (NH_4)_2SO_4 + 60\ Me\ SO_4 + 45\ (NH_4)_2S + 330\ NH_3 + 30\ H_2O \rightarrow 210\ (NH_4)_2SO_4 + 247.5\ NH_3 + 45\ MeS + 15\ Me(OH)_2$$

The filtrate (line 61) is stripped in column (62) by means of steam (line 63) and there is thus 247.5 kmoles of $NH_3$ (line 64).

After stripping, the solution, containing essentially 210 kmoles of $(NH_4)_2SO_4$, is conveyed through line (65) to reactor (66) where it is contacted with a mixture containing 45 kmoles of CaS and 165 kmoles of CaO, so as to simultaneously carry out the following reactions:

$$45\ CaS + 45\ (NH_4)_2SO_4 \rightarrow 45\ CaSO_4 + 45\ (NH_4)_2S$$

$$165\ CaO + 165\ (NH_4)_2SO_4 \rightarrow 165\ CaSO_4 + 330\ NH_3 + 165\ H_2O$$

The calcium sulfate cake is filtered (filter 67), washed and fed to the reduction furnace (68) adjusted for simultaneously delivering 165 kmoles of CaO and 45 kmoles of CaS (line 69) in accordance with the reactions:

$$45\ CaSO_4 + (C) \rightarrow 45\ CaS + (CO + CO_2)$$

$$165\ CaSO_4 + (C) \rightarrow 165\ CaO + (CO + CO_2) + 165\ SO_2$$

Coke is introduced through line (59).

Gases containing the $SO_2$ produced in the furnace are coveyed through line (70) to the absorption column (71) fed with ammonia through line (64).

The absorption reaction may be written:

$$165\ SO_2 + 247.5\ NH_3 \rightarrow 82.5\ NH_4HSO_3 + 82.5\ (NH_4)_2SO_3$$

The sulfitic solution recovered at the bottom of column (71) is fed to reactor (53) through line (52).

The filtrate from filter (67) is stripped in column (72) by means of steam (line 73). The top effluent containing $H_2S$ and $NH_3$ is conveyed through line (57) to reactor (56). Purified water is discharged from the bottom of column (72) through line (74). This water does not contain any more sulfuric acid. The heavy metals are present in amounts smaller than 1 ppm by weight.

EXAMPLE 7 (FIG. 6)

This example relates to the treatment of a sulfuric waste wter containing 150 kmoles of sulfuric acid and 45 kmoles of metal sulfates (line 51) by means of a sulfitic solution containing 75 kmoles of ammonium sulfite and 75 kmoles of ammonium bisulfite (line 52), in reactor (53). 150 kmoles of $SO_2$ evolve, 75 kmoles of ammonium sulfate and 75 kmoles of ammonium bisulfate (line 55) are produced according to the reaction:

$$150\ H_2SO_4 + 45\ MeSO_4 + 75\ NH_4HSO_3 + 75\ (NH_4)_2SO_3 \rightarrow 150\ SO_2 + 75\ NH_4HSO_4 + 75\ (NH_4)_2SO_4 + 45\ MeSO_4 + 150\ H_2O$$

The resulting solution, free of $SO_2$, is contacted in reactor (56) with a solution containing 300 kmoles of $NH_3$ and 45 kmoles of $(NH_4)_2S$ (line 57). The metals are thus precipitated in the form of sulfides which are filtered, washed and withdrawn from the cycle (filter 58). There are thus withdrawn 45 kmoles of metal sulfides (line 60). The precipitation reaction may be written:

$$75\ NH_4HSO_4 + 75\ (NH_4)_2SO_4 + 45\ MeSO_4 + 45\ (NH_4)_2S + 300\ NH_3 \rightarrow 195\ (NH_4)_2SO_4 + 225\ NH_3\ 45\ MeS$$

The filtrate (line 61) is stripped in column (62) by means of steam (line 63) and there is thus withdrawn 225 kmoles of ammonia (line 64).

After stripping, the solution, containing essentially 195 kmoles of $(NH_4)_2SO_4$ is conveyed to reactor (66) where it is contacted with a mixture containing 45 kmoles of CaS and 150 kmoles of CaO, in order to carry out simultaneously the reactions:

$$45\ CaS + 45\ (NH_4)_2SO_4 \rightarrow 45\ CaSO_4 + 45\ (NH_4)_2S$$

$$150\ CaO + 150\ (NH_4)_2SO_4 \rightarrow 150\ CaSO_4 + 300\ NH_3 + 150\ H_2O$$

The calcium sulfate cake is filtered (filter 67), washed and sent to the reduction furnace (68) adjusted for simultaneously delivering 150 kmoles of CaO and 45 kmoles of CaS (line 69) according to the reaction:

$$45\ CaSO_4 + (C) \rightarrow 45\ CaS + (CO + CO_2)$$

$$150\ CaSO_4 + (C) \rightarrow 150\ CaO + 150\ SO_2 + (CO + CO_2)$$

The gases containing the $SO_2$ produced in the furnace are conveyed through line (70) to the absorption column (71), fed with ammonia through line (64). The absorption reaction may be written:

$$150\ SO_2 + 225\ NH_3 \rightarrow 75\ NH_4HSO_3 + 75\ (NH_4)_2SO_3$$

The sulfitic solution recovered from the bottom of the column (71) is fed to reactor (53) through line (52). The filtrate from filter (67) is stripped in column (22) by means of steam (line 73). The top effluent containing $H_2S$ and $NH_3$ is fed through line (57) to reactor (56). The purified water is discharged from the bottom of column (72) through line (74). It no longer contains sulfuric acid and is substantially free from heavy metals (less than 1 ppm by weight of each metal).

EXAMPLE 8

The operations of example 6 are repeated.

However, in order to precipitate the metal sulfides in the reactor (56), we make use of a solution containing 45 kmoles of $(NH_4)_2S$ and only 90 kmoles of $NH_3$. The precipitation reaction may be written:

$$52.5\ NH_4HSO_4 + 975\ (NH_4)_2SO_4 + 60\ MeSO_4 + 45\ (NH_4)_2S + 90\ NH_3 + 30\ H_2O \rightarrow 210\ (NH_4)_2SO_4 + 7.5\ NH_3 + 45\ MeS + 15\ Me(OH)_2$$

The filtrate of the sulfides no longer contains $NH_3$ in noticeable amounts and is, accordingly, not stripped.

The sequence of the operations is continued in the same manner as in example 6.

During the second stripping in column (72) we recover, at the top, 337.5 kmoles of $NH_3$ and 45 kmoles of $H_2S$. The stream is separated by distillation into a distillate containing 45 kmoles of $H_2S$ and 90 kmoles of $NH_3$, used for the precipitation, and a residue containing 247.5 kmoles of $NH_3$, used for the absorption of $SO_2$ in column (71).

The waste water is substantially free from sulfuric acid and from heavy metals (less than 1 ppm b.w. of each metal).

We claim:

1. A process for producing sulfur dioxide, from waste water containing sulfuric acid, which comprises the following steps: (a) reacting the waste water with an aqueous solution of ammonium sulfite and separating of the formed sulfur dioxide from the resulting solution, (b) reacting calcium oxide with the solution obtained in step (a) in order to precipitate the sulfate ions in the form of calcium sulfate and to form an aqueous solution of ammonia, (c) vaporizing ammonia from the aqueous solution, (d) reducing the calcium sulfate by means of carbon so as to form calcium oxide and a sulfur dioxide containing gas, (e) contacting the ammonia from step (c) with the sulfur dioxide-containing gas and with water, so as to form an aqueous solution of ammonium sulfite, (f) feeding back at least a portion of said aqueous solution to step (a), and (g) feeding back to step (b) at least a portion of the calcium oxide obtained in step (d).

2. A process according to claim 1 wherein in step (b), calcium oxide is used in admixture with calcium sulfide and, in step (d), calcium sulfate is only partly reduced so as to obtain a mixture of calcium oxide and calcium sulfide in a molar ratio of CaS to CaO of 0.1 : 1 to 10 : 1 which is fed back to step (b), thereby obtaining as products from said step (b) calcium sulfate and an aqueous solution in which ammonia is at least partly in the form of ammonia sulfide, and wherein said aqueous solution is heated to obtain a gas containing ammonia and hydrogen sulfide, and at least a portion of said gas is reacted with at least a portion of the sulfur dioxide formed in step (a), so as to produce sulfur and to liberate ammonia, and said ammonia is fed, at least partly, to step (e).

3. A process according to claim 2 in which the waste water also contains ammonium sulfate.

4. A process according to claim 2, in which the waste water contains at least one soluble metal sulfate whose sulfide is insoluble in the presence of free ammonia, the aqueous solution obtained as product from step (b) is stripped with steam in two steps, so as to recover a first stream of ammonia of high hydrogen sulfide content and then a second stream of ammonia of low hydrogen sulfide content, the first steam being used for precipitating said soluble sulfate contained in the waste water and the second stream being reacted with sulfur dioxide to produce elemental sulfur.

5. A process according to claim 1, in which waste water also contains at least one soluble sulfate of heavy metal and the solution recovered from step (a) is treated with a member of the group consisting of hydrogen sulfide, ammonia and ammonium sulfide and the formed precipitate is separated from the solution and is subsequently fed to step (b) of the process.

6. A process according to claim 5 wherein hydrogen sulfide or ammonium sulfide is used and the formed metal sulfide is then roasted so as to form sulfur dioxide.

7. A process according to claim 5, in which the metal sulfate is a sulfate of iron, cobalt, nickel, vanadium, aluminum, cadmium, chromium, copper, manganese, tin or zinc.

8. A process according to claim 1 in which, at the end of step (b), calcium sulfate is separated from the ammonia aqueous solution by filtration and only the aqueous solution is fed to step (c).

9. A process according to claim 1 in which the solution of ammonium sulfite from step (e) is contacted with oxygen for partial oxidation of ammonium sulfite to ammonium sulfate, before being fed to step (a).

10. A process for producing sulfur dioxide from waste water containing sulfuric acid and at least one soluble heavy metal sulfate, which comprises the steps of:
  a. reacting the waste water with an aqueous solution of at least one ammonium sulfite, so as to produce gaseous sulfur dioxide and an aqueous solution containing ammonium sulfate and said heavy metal sulfate, and separating said gaseous sulfur dioxide from said aqueous solution;
  b. reacting the aqueous solution obtained in step (a) with ammonia and hydrogen sulfide, the amount of hydrogen sulfide being sufficient to convert at least a part of the heavy metal sulfate to an insoluble heavy metal sulfide andd the ammonia amount being sufficient to obtain a solution containing free ammonia;
  c. separating the insoluble metal sulfide from the solution obtained in step (b);
  d. reacting the solution recovered from step (c) with a mixture of CaO and CaS, the amount of CaS being approximately that required for the production of hydrogen sulfide required in step (b) and the total amount of CaO + Cas being substantially that required for converting ammonium sulfate to insoluble calcium sulfate;
  e. separating said insoluble calcium sulfate from the solution recovered in step (d);
  f. reacting said separated calcium sulfate with carbon at a reduction temperature, the carbon amount being so selected as to produce the mixture of CaO and CaS defined in point (d) and the proportion of Cas being that defined in point (d); separating a sulfur dioxide-containing gas from the mixture of CaS and CaO and conveying said mixture to step (d);
  g. removing hydrogen sulfide and ammonia from the solution obtained in step (e) and feeding back to step (b) said hydrogen sulfide and at least a portion of the ammonia; and
  h. reacting the sulfur dioxide-containing gas obtained in step (f) with ammonia, so as to produce an aqueous solution of at least one ammonium sulfite and feeding step (a) with said aqueous solution.

11. A process according to claim 10 in which, between steps (c) and (d), free ammonia is removed from the solution and fed to step (h) for absorbing sulfur dioxide.

12. A process according to claim 10, in which step (g) is performed in two times, the first of which yields a mixture of hydrogen sulfide and a portion of ammonia which is feed back to step (b) and the second yields additional ammonia which is fed back to step (h).

13. A process according to claim 10, in which step (a) is performed with the use of a substantially equimoecular mixture of ammonium sulfite and ammonium bisulfite.

14. A process according to claim 10, in which the amount of hydrogen sulfide of step (b) is that required to convert all heavy metal sulfate to insoluble heavy metal sulfide.

15. A process according to claim 10, in which the metal sulfate is a sulfate of iron, cobalt, nickel, vanadium, aluminum, cadmium, chromium, copper, manganese, tin or zinc.

* * * * *